April 3, 1928.  1,664,567
C. McPHERSON
POWER TRANSMITTING DEVICE
Filed April 14, 1924
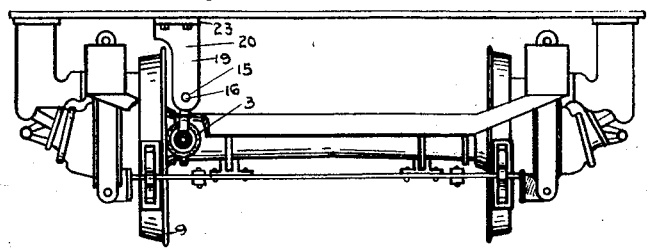
FIG·3.
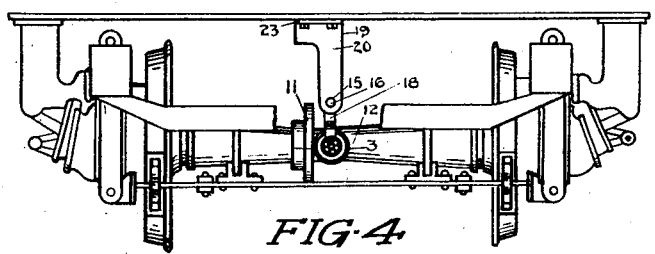
FIG·4.
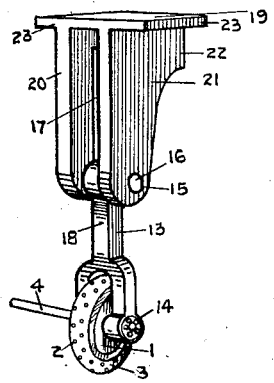
FIG·1.
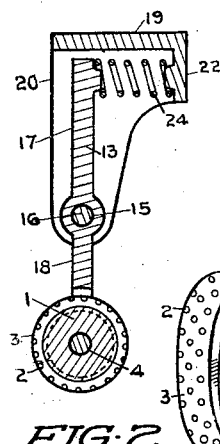
FIG·2.
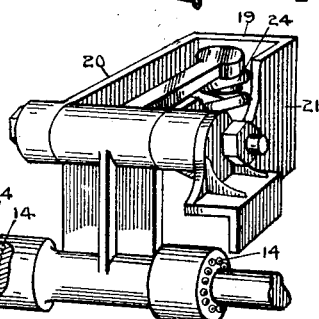
FIG·6.
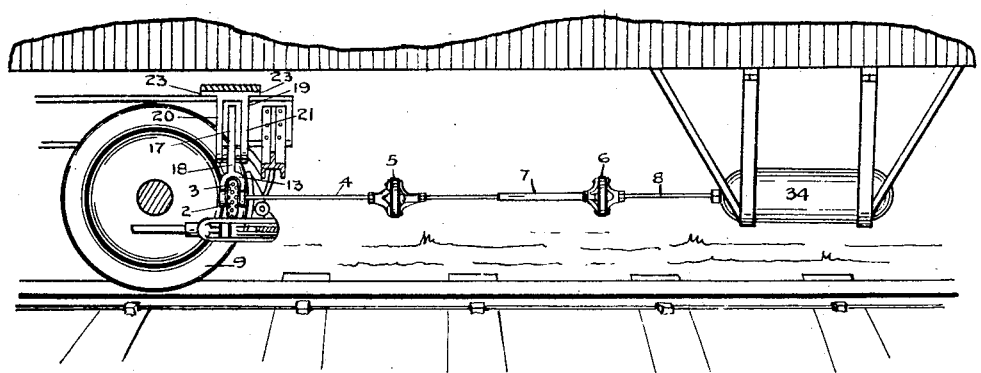
FIG·5.
Inventor
C. McPherson.
By E. J. Fetherstonhaugh
Attorney Patented Apr. 3, 1928.

1,664,567

UNITED STATES PATENT OFFICE.

CHARLES McPHERSON, OF MONTREAL, QUEBEC, CANADA, ASSIGNOR, BY MESNE ASSIGNMENTS, TO FRICTON POWER CORPORATION LIMITED, OF MONTREAL, QUEBEC, CANADA.

POWER-TRANSMITTING DEVICE.

Application filed April 14, 1924. Serial No. 706,617.

The invention relates to power transmitting devices, as described in the present specification and illustrated in the accompanying drawings that form part of the same.

The invention consists essentially of the novel features of construction pointed out in the claim for novelty following a description containing an explanation in detail of an acceptable form of the invention.

The objects of the invention are to expend the product of the rotation of a vehicle wheel or axle in driving a machine or device not connected with the main propelling power; to eliminate the expense of belts as transmitting members from a car axle to a dynamo or other machine; to effect economy particularly on steam railroads in the installation of lighting and ventilating systems in passenger cars, to reduce the cost of maintenance and at the same time insure a positive and constant drive; to avoid the inconvenience and discomfort to passengers on railways; to facilitate the repairs and replacements in power transmission under a railway car by avoiding complicated gear mechanisms and belt drives; and generally to provide a serviceable, durable and efficient power transmission from the running gear of a vehicle.

In the drawings Figure 1 is a perspective view of the hanger and transmission friction wheel apart from the vehicle.

Figure 2 is a vertical view of the hanger and transmission friction wheel.

Figure 3 is a skeleton view showing a front elevation of a car truck and the friction wheel driven by the car wheel.

Figure 4 is a skeleton view showing a front elevation of a car truck and the friction wheel driven by a disk wheel on the axle.

Figure 5 is a side elevation of the train lighting mechanism.

Figure 6 is a perspective view showing a modified form of the hanger.

Like numerals of reference indicate corresponding parts in the various figures.

Referring to the drawings, the rubber tired friction wheel 1 preferably having the vacuum cup recesses 2 in the tire 3 is fixedly mounted on a shaft 4 connected through two joints 5 and 6 and slip shafting 7 to the armature shaft 8.

The wheel 1 engages the car wheel 9 and is driven thereby, or it may engage a disk 11 mounted on the car axle 12 in any suitable manner.

The shaft 4 is journalled at one end of a rocker arm 13 in the bearings 14 here shown as ball bearings though it is not essential to have balls in the bearings. This rocker arm 13 is formed with a pivot journal 15 intermediate of its length through which the pivot 16 extends and the arm beyond the pivot forms the resilient section 17 adapted to hold the bearing section 18 and wheel therein to the tire of the car wheel or the axle disk.

The hanger box 19 is formed with sides 20 and 21 which form bearing supports for the pivot 16, the wall 22 forming a spring stop and joining said sides and the flanges 23 for securing the hanger to the truck. The spring 24 is introduced between the section 17 and encircles the boss 25 from said section 17 and a similar boss from said wall 22 and this spring maintains the friction wheel 1 in engagement with the driving member.

The only difference between Figures 1 and 6 are the shape of the rocker arm and situation of flanges in order to accommodate the invention to the various makes of car trucks.

The rubber tire 3 insures constant rotation of the friction wheel 1 and this tire is let into the grooved rim 36 and preferably vulcanized into the notches 37 said tire having the vacuum cup recesses in the surface or merely roughened as found desirable.

In the operation of this transmission the rotation of the car wheel effects the rotation of the transmission friction wheel, which is held to the wheel tire by the resilient section of the rocker arm and no matter what position the truck frame may be in in relation to the wheel the friction wheel has ample space on the car wheel to maintain a steady drive to the dynamo or other machine. Furthermore the spring holding the friction wheel to the car wheel or axle disk can be made of any desired strength, so that by no chance will the proper frictional resistance be missing.

What I claim is:—

In power transmission for train lighting purposes, a truck bracket formed with a base and parallel hangers therefrom constituting a pivot bearing therebetween and closed in at the inner ends to form a housing and an abutment for a spring, a rocker arm having a central pivot orifice journalled in said pivot bearing, a loose spring engaging the inner end of said arm and said abutment and enclosed by said housing, a friction roller and transmission shaft therefrom journalled at the outer end of said rocker arm, a car axle and a friction disk fixedly mounted on said axle and driving said friction roller.

Signed at Montreal, Canada, this 21st day of March 1924.

CHARLES McPHERSON.